(12) United States Patent
Conrad et al.

(10) Patent No.: US 9,939,885 B2
(45) Date of Patent: *Apr. 10, 2018

(54) METHOD AND APPARATUS FOR EFFICIENT STORE/RESTORE OF STATE INFORMATION DURING A POWER STATE TRANSITION

(71) Applicant: Intel Corporation, Santa Clara, CA (US)

(72) Inventors: Shaun M. Conrad, Cornelius, OR (US); Jared E. Bendt, Hillsboro, OR (US); Janardhan Lavakumar, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/201,491

(22) Filed: Jul. 3, 2016

(65) Prior Publication Data

US 2016/0313787 A1    Oct. 27, 2016

Related U.S. Application Data

(63) Continuation of application No. 13/631,657, filed on Sep. 28, 2012, now Pat. No. 9,383,812.

(51) Int. Cl.
*G06F 1/32* (2006.01)
*G06F 13/00* (2006.01)

(52) U.S. Cl.
CPC ............ *G06F 1/3296* (2013.01); *G06F 1/324* (2013.01); *G06F 1/3243* (2013.01); *G06F 13/00* (2013.01);

(Continued)

(58) Field of Classification Search
None
See application file for complete search history.

(56) References Cited

U.S. PATENT DOCUMENTS

| 8,689,021 B1 | 4/2014 | Bai et al. |
| 2002/0038328 A1 | 3/2002 | Morisawa |

(Continued)

FOREIGN PATENT DOCUMENTS

| CN | 101876964 A | 11/2010 |
| WO | 2012125145 A1 | 9/2012 |

OTHER PUBLICATIONS

PCT/US2013/048663 Notification of Transmittal of the International Search Report and the Written Opinion of the International Searching Authority, dated Oct. 22, 2013, 10 pages.

(Continued)

*Primary Examiner* — Kim Huynh
*Assistant Examiner* — Danny Chan
(74) *Attorney, Agent, or Firm* — Nicholson De Vos Webster & Elliott LLP

(57) ABSTRACT

A processor is described having streamlining circuitry that has a first interface to receive information from a memory describing: i) respective addresses for internal state information of a power domain; ii) respective addresses of a memory where the internal state information is stored when the power domain is powered down; and, iii) meta data for transferring the state information between the power domain and where the internal state information is stored when the power domain is powered down.

23 Claims, 6 Drawing Sheets

(52) U.S. Cl.
CPC ....... *Y02B 60/1217* (2013.01); *Y02B 60/1239* (2013.01); *Y02B 60/1285* (2013.01); *Y02B 60/32* (2013.01)

(56) References Cited

U.S. PATENT DOCUMENTS

| | | |
|---|---|---|
| 2007/0214349 A1 | 9/2007 | Gu et al. |
| 2008/0209233 A1 | 8/2008 | Kumar et al. |
| 2009/0158067 A1 | 6/2009 | Bodas et al. |
| 2009/0172423 A1 | 7/2009 | Song et al. |
| 2010/0106886 A1 | 4/2010 | Marcu et al. |
| 2011/0055469 A1 | 3/2011 | Natu et al. |
| 2011/0231595 A1 | 9/2011 | Wakrat et al. |
| 2012/0179927 A1 | 7/2012 | Sodhi et al. |
| 2012/0221843 A1 | 8/2012 | Bak et al. |
| 2012/0221875 A1 | 8/2012 | Bak et al. |
| 2013/0061064 A1 | 3/2013 | Ananthakrishnan et al. |
| 2013/0159755 A1 | 6/2013 | Presant et al. |
| 2013/0166819 A1 | 6/2013 | Yerushalmi et al. |
| 2013/0198549 A1 | 8/2013 | Longnecker et al. |
| 2013/0318320 A1 | 11/2013 | Mann |
| 2014/0032955 A1 | 1/2014 | Boelter |

OTHER PUBLICATIONS

PCT/US2013/048663 Notification Concerning Transmittal of International Preliminary Report on Patentability, dated Apr. 9, 2015, 7 pages.
Final Office Action from U.S. Appl. No. 13/631,657, dated May 21, 2015, 16 pages.
First Office Action and Search Report from foreign counterpart Chinese Patent Application No. 201380045547.7, dated Dec. 30, 2016, 18 pages. (Transaltion available only for office action).
Non-Final Office Action from U.S. Appl. No. 13/631,657, dated Jan. 8, 2015, 14 pages.
Non-Final Office Action from U.S. Appl. No. 13/631,657, dated Oct. 20, 2015, 18 pages.
Notice of Allowance from U.S. Appl. No. 13/631,657, dated Mar. 2, 2016, 10 pages.
Second Office Action and Search Report from foreign counterpart Chinese Patent Application No. 201380045547.7, dated Sep. 15, 2017, 23 pages. (Transaltion available only for office action).

METHOD AND APPARATUS FOR EFFICIENT STORE/RESTORE OF STATE INFORMATION DURING A POWER STATE TRANSITION

CROSS REFERENCE TO RELATED APPLICATIONS

The present patent application is a continuation application claiming priority from U.S. patent application Ser. No. 13/631,657, filed Sep. 28, 2012, and titled: "Method and Apparatus For Efficient Store/Restore of State Information During A Power State Transition", which is incorporated herein by reference in its entirety.

FIELD OF INVENTION

The field of invention relates generally to computing systems, and, more specifically, to a method and apparatus for efficient store/restore of state information during a power state transition.

BACKGROUND

FIG. 1 shows the architecture of a standard multi-core processor design 100. As observed in FIG. 1, the processor includes: 1) multiple processing cores 101_1 to 101_N; 2) an interconnection network 102; 3) a last level caching system 103; 4) a memory controller 104 and an I/O hub 105. Each of the processing cores contain one or more instruction execution pipelines for executing program code instructions. The interconnect network 102 serves to interconnect each of the cores 101_1 to 101_N to each other as well as the other components 103, 104, 105.

The last level caching system 103 serves as a last layer of cache in the processor 100 before instructions and/or data are evicted to system memory 108. The memory controller 104 reads/writes data and instructions from/to system memory 108. The I/O hub 105 manages communication between the processor and "I/O" devices (e.g., non volatile storage devices and/or network interfaces). Port 106 stems from the interconnection network 102 to link multiple processors so that systems having more than N cores can be realized. Graphics processor 107 performs graphics computations. Other functional blocks of significance (phase locked loop (PLL) circuitry, power management circuitry, etc.) are not depicted in FIG. 1 for convenience.

As the power consumption of computing systems has become a matter of concern, most present day systems include sophisticated power management functions. A common framework is to define both "performance" states and "power" states. A processor's performance is its ability to do work over a set time period. The higher a processor's performance state the more work it can do over the set time period. A processor's performance can be adjusted during runtime by changing its internal clock speeds and voltage levels. A processor's power consumption increases as its performance increases.

A processor's different performance states correspond to different clock settings and internal voltage settings so as to effect a different performance vs. power consumption tradeoff. According to the Advanced Configuration and Power Interface (ACPI) standard the different performance states are labeled with different "P numbers": P0, P1, P2 . . . P_R, where, P0 represents the highest performance and power consumption state and P_R represents the lowest level of power consumption that a processor is able to perform work at. The term "R" in "P_R" represents the fact that different processors may be configured to have different numbers of performance states.

In contrast to performance states, power states are largely directed to defining different "sleep modes" of a processor. According to the ACPI standard, the C0 state is the only power state at which the processor can do work. As such, for the processor to enter any of the performance states (P0 through $P_P\_R$), the processor must be in the C0 power state. When no work is to be done and the processor is to be put to sleep, the processor can be put into any of a number of different power states C1, C2 . . . CM where each power state represents a different level of sleep and, correspondingly, a different amount of time needed to transition back to the operable C0 power state. Here, a different level of sleep means different power savings while the processor is sleeping.

A deeper level of sleep therefore corresponds to slower internal clock frequencies and/or lower internal supply voltages and/or more blocks of logic that receive a slower clock frequency and/or a lower supply voltage. Increasing C number corresponds to a deeper level of sleep. Therefore, for instance, a processor in the C2 power state might have lower internal supply voltages and more blocks of logic that are turned off than a processor in the C1 state. Because deeper power states corresponds to greater frequency and/or voltage swings and/or greater numbers of logic blocks that need to be turned on to return to the C0 state, deeper power states also take longer amounts of time to return to the C0 state.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
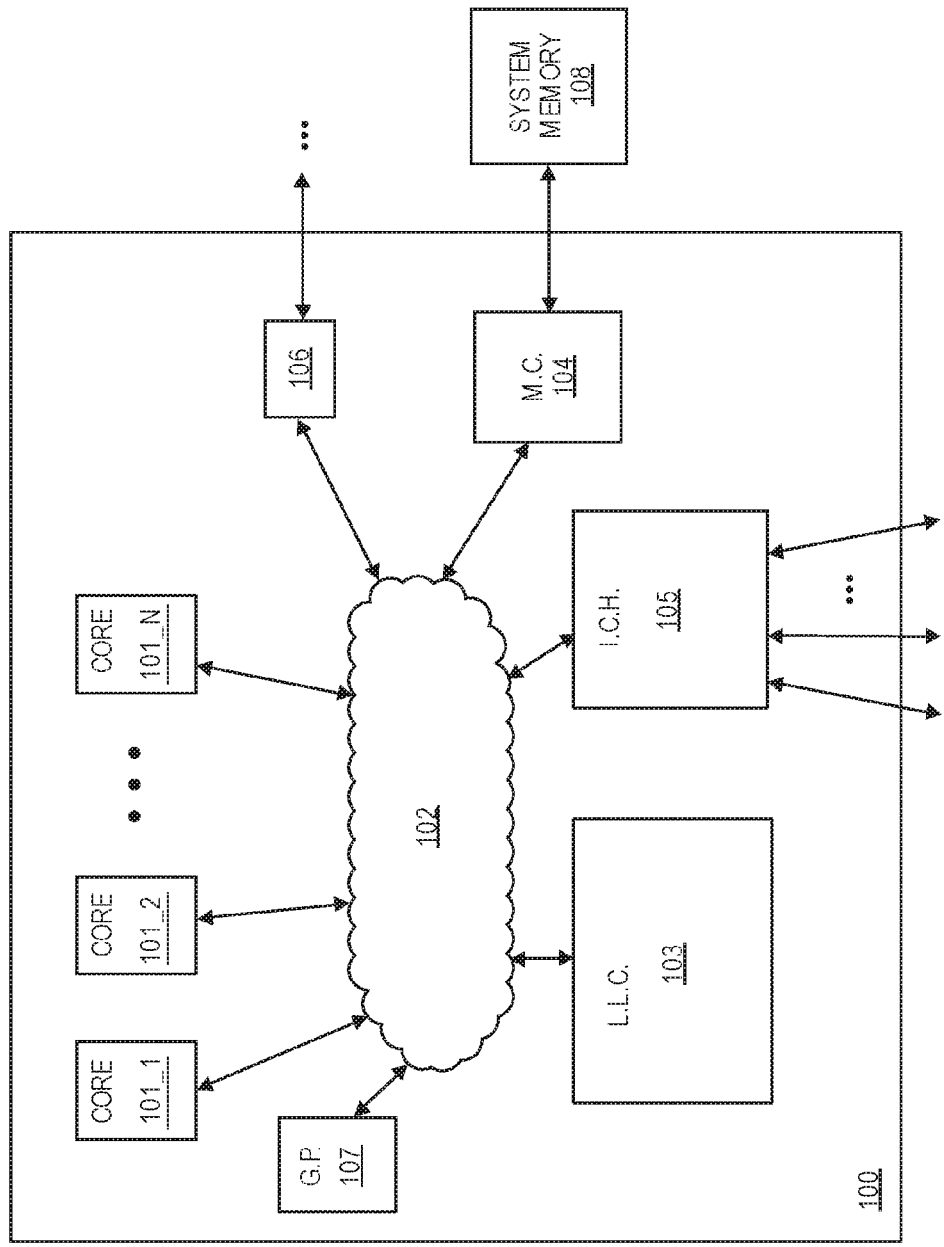
FIG. 1 shows a processor.
Figure 2:
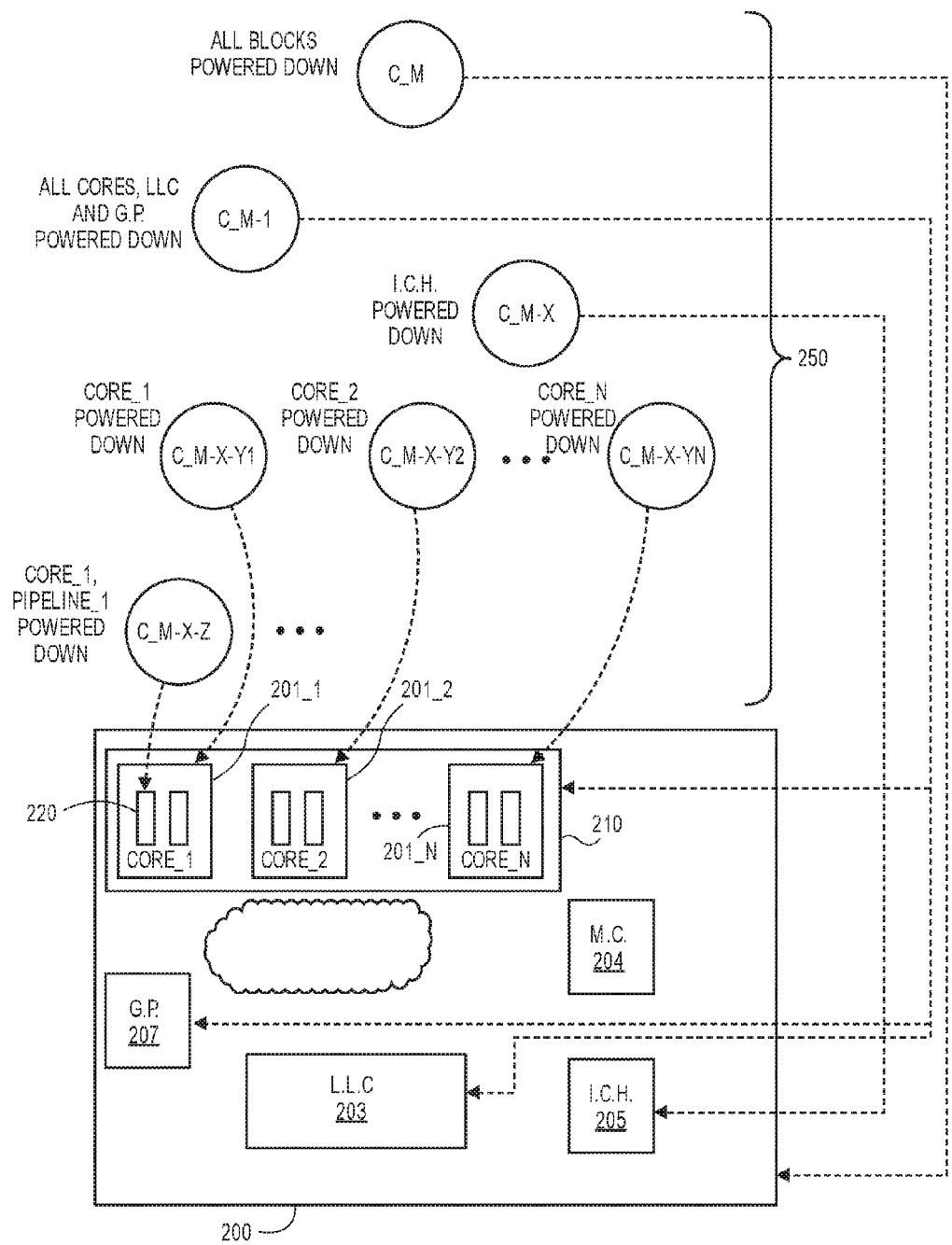
FIG. 2 shows a power state hierarchy and corresponding power domains.

FIG. 2 shows an exemplary power state hierarchy 250 that is consistent with the processor model of FIG. 1. The hierarchy 250 is exemplary to more easily illustrate the basic concepts of the present discussion. The hierarchy 250 reflects the number of functional blocks that, while the processor is in a sleep state, receive insufficient supply voltage to maintain information state. Here, as is understood by those of ordinary skill, logic circuits contain storage circuits, such as registers and memory circuits, that hold information during normal operation. If such circuits have their voltage lowered below a critical level during a processor sleep state, the information they hold will be lost if it is not saved beforehand.

The top of the hierarchy 250 reflects a power state C_M having a maximum number of functional blocks that receive insufficient supply voltage during any particular sleep state, while, the bottom of the hierarchy 250 reflects a power state C_M-X-Z having the smallest number of functional blocks that receive insufficient supply voltage to maintain information state. The top node C_M of the hierarchy 250 therefore perhaps corresponds to the deepest sleep state of the processor while the bottom node C_M-X-Z of the hierarchy 250 corresponds to a lighter sleep state of the processor. As different sleep states of the processor might also specify different clock frequencies and/or lowered supply voltages that do not fall beneath the critical supply voltage, it is possible that not all sleep states of the processor are reflected in the hierarchy. Also, for the sake of simplicity, the hierarchy 250 probably reflects less circuit blocks and/or less combinations of circuit blocks that receive insufficient supply voltage than the power states an actual processor might include. As such, it should be understood that the hierarchy 250 of FIG. 2 is illustrative for the purpose of explanation.

Each node in the hierarchy 250 is depicted to indicate which blocks of the processor receive insufficient supply voltage as part of its associated power state. That is, each node indicates, for its corresponding power state, which blocks of the processor are to have their information state saved before the power state is entered. For example, the C_M state corresponds to all blocks of the processor receiving insufficient supply voltage, therefore, the C_X node points to all the blocks of the processor. By contrast, the C_M-X-Y1 state corresponds to only one general purpose core 201_1 receiving insufficient supply voltage, therefore, the C_M-X-Y1 node points to that specific processor core 201_1. Further still, the C_M-X-Z state corresponds to only one pipeline 220 within the same core 201_1 receiving insufficient supply voltage, therefore the C_M-X-Z node points only to one pipeline 220 within the core (the exemplary processor cores are understood to be dual pipeline cores where each pipeline has its own dedicated power plane). Again, the hierarchy 250 and associated power state definitions are only exemplary in terms of breadth and granularity. Designers may define other sleep states without departing from the main concepts presently being discussed.

Each node of hierarchy 250 of FIG. 2 essentially outlines which block(s) of a processor should have its internal state saved prior to entry into a particular power state. For example, FIG. 2 indicates that: 1) approximately all internal state of the processor 200 should be saved prior to entry into the C_M state; 2) all internal state of processing core 201_1 should have its internal state saved prior to entry into the C_M-X-Y1 state; and, 3) all internal state of pipeline 220 should have its internal state saved prior to entry into the C_M-X-Z state. Internal state is saved prior to entry into a power state by reading the information from the registers and/or memory cells of the affected block and saving the information to another storage resource such as a memory circuit external to the processor.

A "power domain" refers to a block of circuitry whose supply voltage can be individually lowered so as to necessitate the saving of that block's internal state information prior to entry of a power state whose definition includes lowering the block's supply voltage beneath a critical level. As such, FIG. 2 also outlines exemplary power domains of a processor. For convenience, in most cases power domains are depicted in FIG. 2 as being commensurate with a logic block. Here, e.g., each of encircled regions 200, 210, 201_1 and 220 of FIG. 2 correspond to a unique power domain definition. Note that larger power domains (e.g., power domain 200) can be composed of smaller power domains (e.g., power domains 203, 204, 205, 207 and 210), and, similarly, a single power domain can be implicated by more than one power state. For example, the power domain for the C_M-X-Y1 state includes the power domain for the C_M-X-Z power state.

Figure 3:
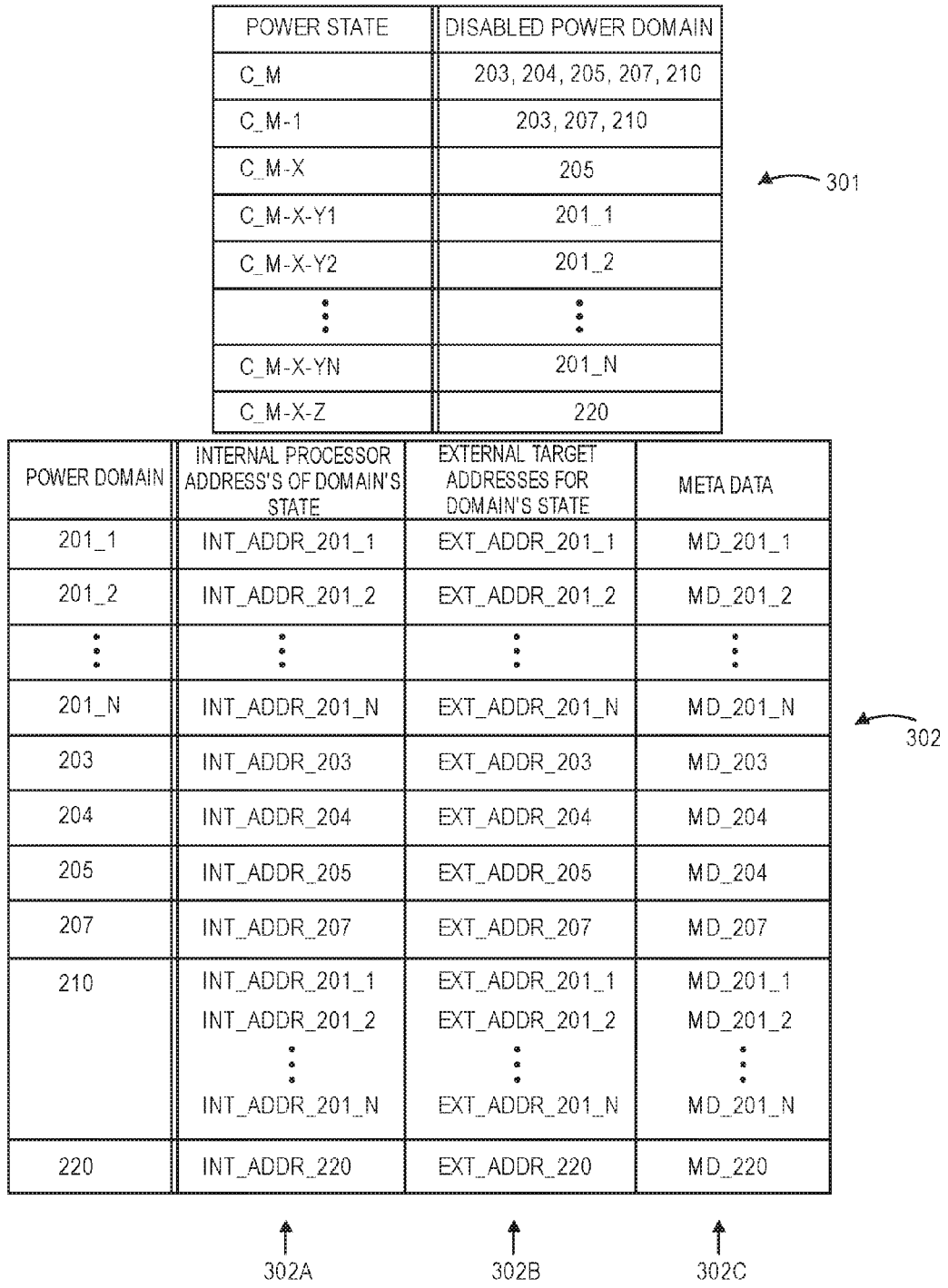
FIG. 3 shows tabular information describing the power state hierarchy and corresponding power domains.

FIG. 3 shows a re-representation of the hierarchy of FIG. 2 that is suitable, for instance, as recorded tabulated information within a computing system (such as within a Read Only Memory (ROM)). FIG. 3 shows, in portion 301, for each power state supported by the processor, which power domains are to receive supply voltage beneath a critical threshold so as to necessitate saving of the domain's internal state information prior to entry into the power state. Additionally, the tabular information of FIG. 3 also specifies, in portion 302, for each power domain: 1) the addresses of the power domain's internal storage circuits (e.g., the addresses of the internal registers and/or memory circuits) 302a; 2) the addresses of the storage resource (e.g., external memory) where, in order to transition to a power state that reduces the voltage of the power domain beneath a critical threshold, the information read from the power domain's internal storage circuits is to be saved beforehand 302b; and, 3) special accessing meta-data 302c. The special accessing meta-data is a field that indicates any special requirements of the internal information saving process. Examples include sequencing (reading certain internal storage circuits before others) and time delays (reading certain storage circuits only after a certain amount of time has passed after some event).

Although the above discussion has been written with a view toward saving the internal state information of a power domain responsive to entry into a power state that lowers the domain's supply voltage beneath a critical state so as to necessitate the saving of the power domain's internal state, it should be understood that the reverse situation also applies. That is, upon entry to a power state that raises a power domain's voltage from beneath the critical voltage to above it, the power domain's internal state needs to be restored by reading the previously saved information from an (e.g., external) memory device and writing the information back into the power domain's internal registers and/or memory circuits. Note that the tabular information of FIG. 3 can be utilized for both saving and restoration purposes.

Figure 4A:
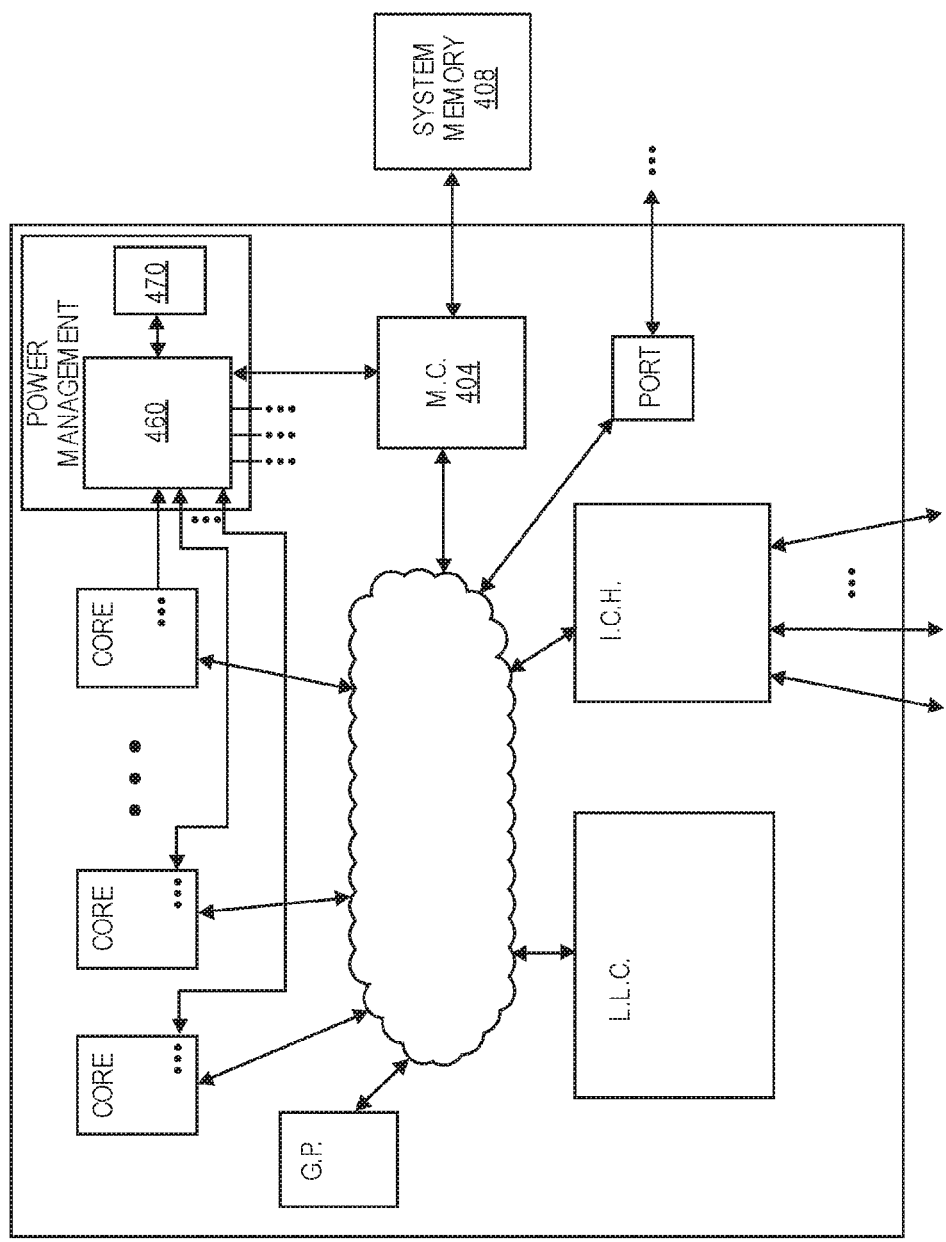
FIG. 4a shows an embodiment of a processor having streamlining circuitry for saving a power domain's internal state.
Figure 4B:
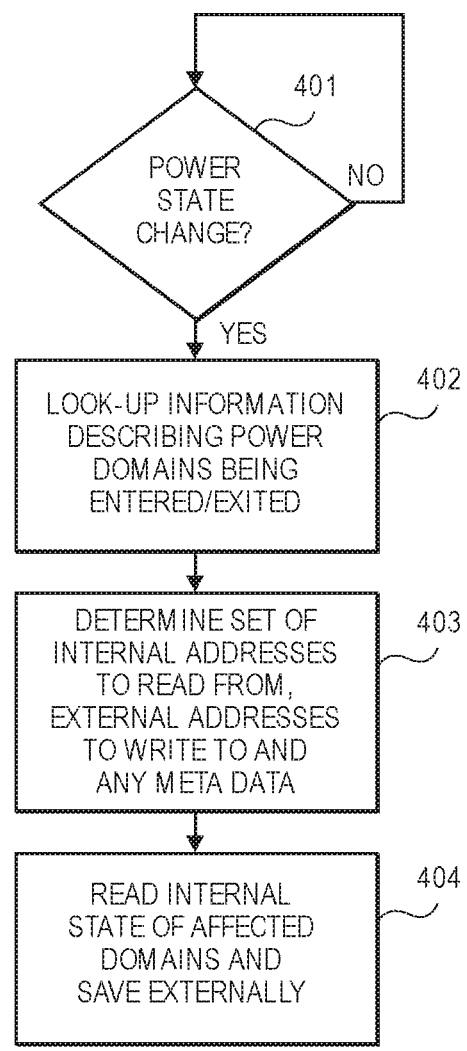
FIG. 4b shows a streamlining process for saving a power domain's internal state information.

FIGS. 4a and 4b pertain to a design for streamlining the information state saving and restoring operations for the power domains of a processor in response to the entry/exit of the processor's associated power states. As observed in FIG. 4a, specialized streaming circuitry 460 (e.g., within power management circuitry) embedded on the processor is coupled to a ROM 470 that stores tabularized information, such as that outlined in FIG. 3, used by the streaming circuitry 460 to understand, as a function of which power state is about to be exited and which power state is about to be entered, which internal storage circuits need to have their information stored or restored. The streamlining circuitry 460 also has access to the internal registers and memory circuits within the processor's various power domains, and, has access to the storage resource (e.g., external memory circuitry 408 via memory control hub 404) where the information is written to when being saved, or, read from when being restored. The complex reach of streamlining circuitry 460 into the different power domains cannot be drawn simplistically. Hence only artifacts of it are indicated in FIG. 4a. The other components of the processor observed on FIG. 4a have already been described with respect to FIG. 1.

FIG. 4b shows an embodiment of a methodology performed by the streamlining circuitry 460 of FIG. 4a. According to the embodiment of FIG. 4b, the streamlining circuitry is first made aware of a power state change 401. That is, the streamlining circuitry is made aware of a specific power state being entered and specific power state being exited. The streamlining circuitry then, in an embodiment, looks up information that describes, for both the power state being entered and the power state being exited, which power domains have (or do not have) a sufficient supply voltage to retain their information state 402. Any additional power domains from the state being exited to the state being entered, in the case of dropping down to a deeper sleep state, corresponds to the specific power domains that should have their information stored. Likewise any additional power domains from the state being exited to the state being entered, when waking up from a deeper sleep state, corresponds to the specific power domains that should have their information restored.

For instance, referring to FIG. 3, when dropping down from the C_M-X-Y1 state in which all power domains have sufficient supply voltage to retain their internal information state except for the core 201_1 power domain, to the C_M-1 power state in which power domains 203, 207, and 201_1 through 201_N do not receive a supply voltage sufficient to retain internal state, then, power domains 203, 207 and 201_2 through 201_N should have their internal state saved by the streamlining circuitry 460 prior to formal entry to the C_M-1 state. Contra-wise, when awaking out of the C_M-X-Y1 state back into the C_M-1 power state these same power domains correspond to the set of power domains that should have their internal state restored by the streamlining circuitry. In theory, the difference between any two power states as to which power domains are (or are not) provided sufficient supply voltage to retain internal state information should define which power domains should have their state stored or restored for any transition between the two states.

The streamlining circuitry 460 can begin to gain an understanding of this difference, for example, by referring to the two entries in portion of the tabular data of FIG. 3 that correspond to the two power states involved in the power state transition. That is, for instance, if the power state transition is between power states C_M-X-Y1 and C_M-1, the streamlining circuitry 460 can refer to the entries for C_M-X-Y1 and C_M-1 from portion 301 of FIG. 3 in ROM 470. Here, by referring to these entries in portion 301, the streamlining circuitry 460 will understand that power state C_M-X-Y1 includes power domain 201_1, and, power state C_M-1 includes power domains 203, 207 and 210. In a simpler implementation, all power state transitions involve a same, common power state (e.g., all power state transitions must transition from or to the C0 state). In this case, a single entry can be used to define which power domains are to have their internal state stored (or restored) for any power state transition.

Once the affected power domains are understood for the transition, the streamlining circuitry 460 next looks up information that defines, for each power domain, the addresses of the power domain's internal state, the addresses of the storage resource where the internal state is to be written to in the case of storage (or read from in the case of re-storage), and, any additional meta data that may apply (e.g., sequencing specifics, time delay specifics, etc.) 403. Such information can be obtained, for example, by reference to the particular entry for each power domain in portion 302 of the tabular information of FIG. 3.

Thus, continuing with the above example, after the look-up into portion 301 of the tabular information in ROM 470 reveals that power domains 201_1, 203, 207 and 210 are implicated by the power state transition from state C_M-X-Y1 to C_M-1, the streamlining circuitry 460 may next look up the entries for each of power domains 201_1, 203, 207 and 210 in portion 302 of ROM 470. This look up will provide the streamlining circuitry 460 with: 1) the internal address space (whether register or memory) of the internal state information within each of the power domains so the information can be read prior to supply voltage lowering 302*a*; 2) the corresponding external address space where the information is to be saved to 302*b*; and, 3) any meta-data associated with the information saving process 302*c*.

In an effort to specifically define exactly which address space is affected by the power state transition, 403 the returns of the read operations into the ROM are compared for overlap. Here, it is observed that addresses INT_ADDR_201_1 for the power domain associated with the power state that is being departed from (201_1) overlaps with the addresses of one of the power domains (210) associated with the power state that is being entered. This particular overlap in this particular transition sequence means that power domain 201_1 need not have its state information saved during the present transition because its state information has already been saved. As such, the streamlining circuitry 460 will recognize that it only needs to save the state information of power domains 201_2 through 201_N for power domain 210 for this transition (along with the state information of power domains 203 and 207).

Once any overlap has been resolved so that the set of affected addresses are identified, the state information from the affected power domains in read from their appropriate addresses (generically represented in portion 302*a* of FIG. 3 as "INT_ADDR_") and saved to the corresponding listed address (generically represented in portion 302*b* in FIG. 3 as "EXT_ADDR_") 404. Any associated special conditions associated with the saving process for a particular power domain (generically represented in portion 302*c* in FIG. 3 as "MD_") is applied. Some special conditions may be, for instance, to read certain registers before others, timing requirements (e.g., waiting for a period of time before a specific registers is read), application of certain masks, etc. As an example, referring to the entry for power domain 201_1 in portion 302 of FIG. 3: 1) the entry INT_ADDR_201_1 represents the set of internal addresses of power 201_1; 2) the entry EXT_ADDR_201_1 represents the set of addresses external to power domain 201_1 where the state information of power domain is to be saved to; and, 3) the entry MD_201_1 represents any applicable conditions for the transfer.

Figure 5:
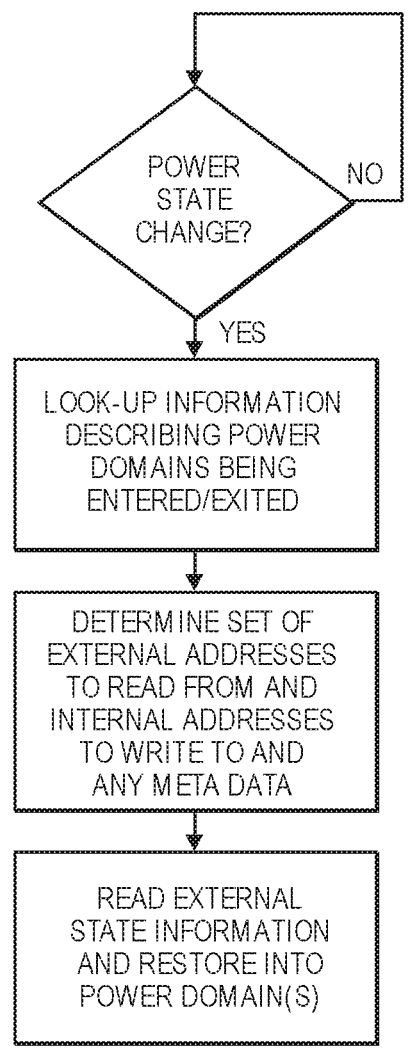
FIG. 5 shows a streamlining process for restoring a power domain's internal state information.

FIG. 5 shows a similar process but for restoration of externally saved state information into a power domain. Notably, the same set of addresses are used during the restoration process—just in opposite order. That is, the EXT_ADDR addresses are used to read the externally saved information and the INT_ADDR addresses are used to write the information back into the power domain. The meta data in column 302*c* of FIG. 3 could be partitioned into two sections: a first section for saving state information externally and a second section for restoring state information internally.

In terms of the restoration process, any overlap of addresses between a power domain of the power state being departed from versus a power domain of a power state being entered into means that the overlapping addresses/domains are to be ignored during the transition (i.e., remain off). Thus, again, the difference between the addresses of the domains of the states involved in the transition determines the set of domains that are affected by the transition.

It is pertinent to point out that the externally saved information of a power domain that is to lose power does not necessarily have to be saved externally from the processor. Conceivably the information could be saved in other storage space of the processor that is to remain powered up after the power state transition. Also, ROM 470 could be implemented as a non volatile ROM. ROM 470 also need not be part of the processor but can be a separate component from it. Component 470 can also be viewed more generally as a memory that need not be a ROM. For example, component could be implemented as a random access memory (RAM), volatile or non volatile, embedded on the processor or external to it.

The streamlining circuitry 460 could be implemented by any of dedicated logic circuitry (e.g., a state machine), a micro-controller, controller or even processor that executes some kind of program code to perform its functions, or, any combination thereof.

Referring back to FIG. 3, the exact architecture of the tabular information can vary from embodiment to embodiment. For example, alternative embodiments may choose to enter all relevant information for a power state (including all addresses and meta data for all its powered down power domains) in a single entry. This avoids having to read the tabular information twice but increases the size of the tabular information. This also permits overlapping power domains of two power states to be identified rather than overlapping address space.

As any of the logic processes taught by the discussion above may be performed with a controller, micro-controller or similar component, such processes may be program code such as machine-executable instructions that cause a machine that executes these instructions to perform certain functions. Processes taught by the discussion above may also be performed by (in the alternative to the execution of program code or in combination with the execution of program code) by electronic circuitry designed to perform the processes (or a portion thereof).

It is believed that processes taught by the discussion above may also be described in source level program code in various object-orientated or non-object-orientated computer programming languages. An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A processor comprising:
    a plurality of power domains including a first power domain for a first processor component and a second power domain for a second processor component; and
    streamlining circuitry to:
        obtain from a memory, for a power state transition from a first power state to a second power state, respective addresses for:
            internal state information of each power domain that is enabled in the first power state, and
            internal state information of each power domain that is to be enabled in the second power state,
        compare the respective addresses for overlap to determine which of the plurality of power domains enabled in the first power state are disabled in the second power state,
        cause a store of the internal state information for each of the determined power domains; and
        applying the stored internal state information for a power domain of the plurality of power domains when the power domain is re-enabled.

2. The processor of claim 1, wherein the streamlining circuitry is to cause a restore from the stored internal state information for each of the plurality of power domains determined to have their internal state information restored.

3. The processor of claim 1, wherein the streamlining circuitry is to obtain meta data for each of the plurality of power domains determined to have their internal state information stored.

4. The processor of claim 3, wherein the meta data describes a sequence at which certain items of internal state information are to be accessed.

5. The processor of claim 3, wherein the meta data describes a time delay before a certain item of internal state information is to be accessed.

6. The processor of claim 1, wherein the second power domain includes the first processor component and the second processor component.

7. The processor of claim 1, wherein the first processor component is a first core and the second processor component is a second core.

8. The processor of claim 1, wherein the first processor component is a first core and the second processor component is a cache separate from the first core.

9. The processor of claim 1, wherein the streamlining circuitry is to further compare the respective addresses for overlap to determine which of the plurality of power domains are to have their internal state information restored.

10. A method comprising:
    providing a plurality of power domains of a processor including a first power domain for a first processor component and a second power domain for a second processor component;
    obtaining, with streamlining circuitry for a power state transition from a first power state to a second power state, respective addresses for:
        internal state information of each power domain that is enabled in the first power state, and
        internal state information of each power domain that is to be enabled in the second power state;
    comparing the respective addresses for overlap to determine which of the plurality of power domains enabled in the first power state are disabled in the second power state;
    storing the internal state information for each of the determined power domains; and
    applying the stored internal state information for a power domain of the plurality of power domains when the power domain is re-enabled.

11. The method of claim 10, further comprising restoring from the stored internal state information for each of the plurality of power domains that are determined to have their internal state information restored.

12. The method of claim 10, further comprising obtaining meta data for each of the plurality of power domains determined to have their internal state information stored.

13. The method of claim 12, wherein the meta data describes a sequence at which certain items of internal state information are to be accessed and the method further comprises the streamlining circuitry accessing the items of internal state information in the sequence.

14. The method of claim 12, wherein the meta data describes a time delay before a certain item of internal state information is to be accessed and the method further comprises the streamlining circuitry imposing the time delay before accessing the certain item of internal state information.

15. The method of claim 10, wherein the second power domain includes the first processor component and the second processor component.

16. The method of claim 10, further comprising comparing the respective addresses for overlap to determine which of the plurality of power domains are to have their internal state information restored.

17. A computing system comprising:
a plurality of power domains including a first power domain for a first processor component and a second power domain for a second processor component;
a memory to store for each of a plurality of power states:
  i) respective addresses for internal state information of a power domain of a power state,
  ii) respective addresses of a memory where the internal state information is to be stored when the power domain is powered down, and
  iii) meta data for transferring the internal state information between the power domain and where the internal state information is to be stored when the power domain is powered down; and
streamlining circuitry coupled to the memory to:
  obtain from the memory, for a power state transition from a first power state to a second power state, respective addresses for:
    internal state information of each power domain that is enabled in the first power state, and
    internal state information of each power domain that is to be enabled in the second power state,
  compare the respective addresses for overlap to determine which of the plurality of power domains enabled in the first power state are disabled in the second power state,
  cause a store of the internal state information for each of the determined power domains; and
  applying the stored internal state information for a power domain of the plurality of power domains when the power domain is re-enabled.

18. The computing system of claim 17, wherein the streamlining circuitry is to cause a restore from the stored internal state information for each of the plurality of power domains that are determined to have their internal state information restored.

19. The computing system of claim 17, wherein the streamlining circuitry is to obtain meta data for each of the plurality of power domains determined to have their internal state information stored.

20. The computing system of claim 17, wherein the meta data describes a sequence at which certain items of the internal state information are to be accessed.

21. The computing system of claim 17, wherein the meta data describes a time delay before a certain item of the internal state information is to be accessed.

22. The computing system of claim 17, wherein the streamlining circuitry provides the memory with an identity of a power state to which the power domain pertains before receiving i), ii), and iii) above.

23. The computing system of claim 17, wherein the streamlining circuitry is to further compare the respective addresses for overlap to determine which of the plurality of power domains are to have their internal state information restored.

* * * * *